United States Patent [19]

Ogino et al.

[11] Patent Number: 4,969,731
[45] Date of Patent: Nov. 13, 1990

[54] LIQUID CRYSTAL PANEL TYPE PROJECTION DISPLAY

[75] Inventors: Masanori Ogino; Yoshiaki Iwahara; Yuzo Tamura, all of Kanagawa, Japan

[73] Assignee: Hitachi, Ltd., Tokyo, Japan

[21] Appl. No.: 461,277

[22] Filed: Jan. 5, 1990

[30] Foreign Application Priority Data

Jan. 1, 1989 [JP] Japan .................................. 64-00397

[51] Int. Cl.⁵ .......................................... G03B 21/00
[52] U.S. Cl. ...................................... 353/34; 353/122; 353/38; 353/31
[58] Field of Search ....................... 353/30, 31, 32, 34, 353/37, 121, 122, 38; 350/331 R

[56] References Cited

U.S. PATENT DOCUMENTS 4,368,963 1/1983 Stolov ..................................... 353/31

FOREIGN PATENT DOCUMENTS 0160437 7/1987 Japan ..................................... 353/30

Primary Examiner—Harry N. Haroian
Attorney, Agent, or Firm—Antonelli, Terry, Stout & Kraus

[57] ABSTRACT

A liquid crystal panel type projection display wherein exit light rays from at least one liquid crystal panel are projected onto a screen for display. Lenses are configured with respect to the liquid crystal panel and the screen so as to enable a large projection field angle.

20 Claims, 6 Drawing Sheets

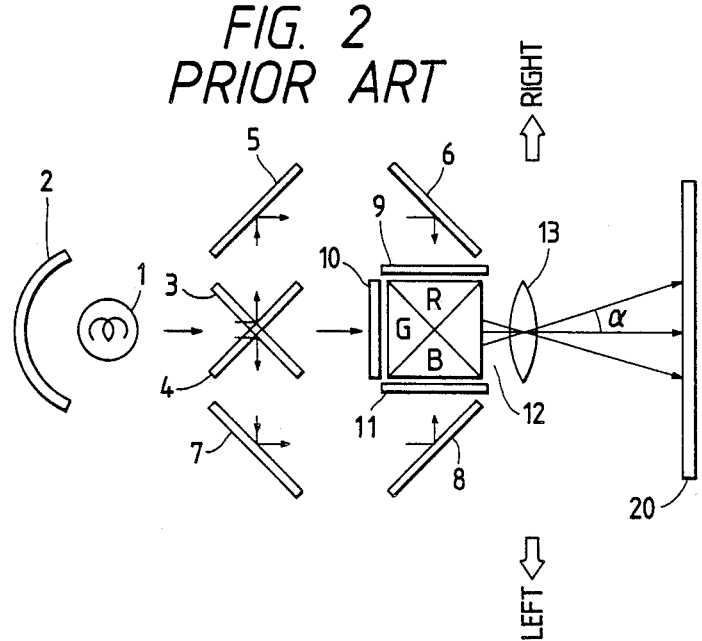
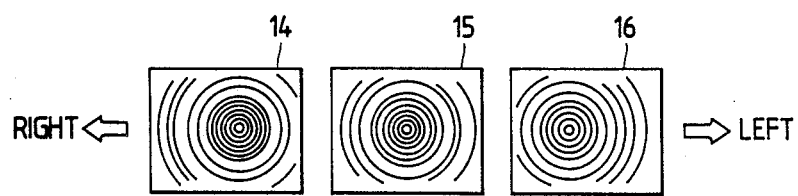

LIQUID CRYSTAL PANEL TYPE PROJECTION DISPLAY

BACKGROUND OF THE INVENTION

The present invention relates to a liquid crystal panel type projection display More particularly, the present invention is directed to a compact, high definition, rear projection type display liquid crystal panel display with an improved lens or liquid crystal panel control system.

The construction of a conventional liquid crystal panel type rear projection display is shown in FIG. 2 wherein the numeral 1 denotes a light source such as a halogen lamp or a xenon lamp, numeral 2 denotes a condenser mirror, numeral 3 denotes a dichroic mirror having the property of reflecting red color and transmitting green and blue colors (red, green and blue colors will hereinafter be referred to simply as R, G and B, respectively), and numeral 4 denotes a dichroic mirror for reflecting B and transmitting R and G. Numerals 5, 6, 7 and 8 denote mirrors, and numerals 9, 10 and 11 denote liquid crystal panels for R, G and B, respectively. The liquid crystal panels may be so-called TFT (Thin Film Transistor) type nematic liquid crystal panels. Numerals 12, 1 3 and 20 denote a dichroic prism, a projection lens and a screen, respectively.

In the construction shown in FIG. 2, color images can be projected onto the screen 20 by inputting image signals to the liquid crystal panels 9, 10 and 11. Such prior art construction is described in '86 Television Society Report IPD 109-5, pp. 23–28. Further, Japanese Patent Application Laid-Open No. 19834/87 describes the use of a Fresnel lens for a liquid crystal panel for controlling light input or output therefrom, but is not concerned with viewing angle of a projection system.

The above-noted prior art is advantageous in that the use of only one projection lens suffices On the other hand, however, it has the drawback that it is structurally difficult to set the value of an image projection field angle, $\alpha$, shown in FIG. 2 at 25° or more. The value $\alpha$ in the prior art is about 23°.

For a front projector, a field angle of 23° or so is appropriate, but for constituting a compact, rear projection type display it is considered necessary to use an optical system having a field angle of about 25° or more, preferably 35° or more. There are two reasons why it is difficult to obtain a field angle of 25° or more in the conventional one-lens, three-panel type construction shown in FIG. 2. The first reason is based upon a physical restriction with regard to the presence of the dichroic prism 12. The second reason is that since the electrooptical conversion characteristic per se of the liquid crystal panels depend on the direction of exit light from the panels, there occurs unevenness in luminance and in color, causing the image quality to be impaired, at diagonal corners on the screen in an optical system having a large field angle of 25° or more.

SUMMARY OF THE INVENTION

It is therefore an object of the present invention to overcome the aforementioned restrictions in the prior art, and to provide a compact, high definition, rear projection type liquid crystal panel display having a wide field angle of 25° or more.

According to the present invention, a liquid crystal panel type rear projection display includes a light source, an optical system for separating light emitted from the light source into light rays of red, green and blue colors and for projecting the light rays onto corresponding liquid crystal panels for red, green and blue, and projection lenses corresponding respectively to the liquid crystal panels for projecting exit light rays from the liquid crystal panels onto a single screen, wherein the centers of the projection lenses are positioned respectively on straight lines connecting the centers of the liquid crystal panels with the center of the screen, with the optical axes of the projection lenses being disposed nearly perpendicularly to the screen, and a Fresnel lens being disposed between an exit surface of each liquid crystal panel and the corresponding projection lens, the lens surface of the Fresnel lens being decentered in accordance with a relative position of the lens to provide a lens center placed on the optical axis of the corresponding projection lens to thereby set a projection field angle at 25° or more with respect to the screen.

According to a feature of the present invention, the Fresnel lens converges the exit light leaving the corresponding liquid crystal panel in a nearly perpendicular direction, toward the center of the corresponding projection lens. In this case, the field angle can be set at at least 25°, and more particularly at at least about 35°. Therefore, it is possible to provide a liquid crystal panel type display having a compact optical system, that is, an optical system having a short projection distance relative to the screen size.

The above and other objects, features, and advantages of the present invention will become more apparent from the following description when taken in connection with the accompanying drawings which show, for the purposes of illustration only, several embodiments in accordance with the present invention.

BRIEF DESCRIPTION OF THE DRAWINGS

FIG. 2 is a top view showing the construction of a conventional liquid crystal panel type display;

FIG. 3 is a front view of the incident surface side of the Fresnel lenses shown in FIG. 1;

DETAILED DESCRIPTION OF THE PREFERRED EMBODIMENTS

Figure 1:
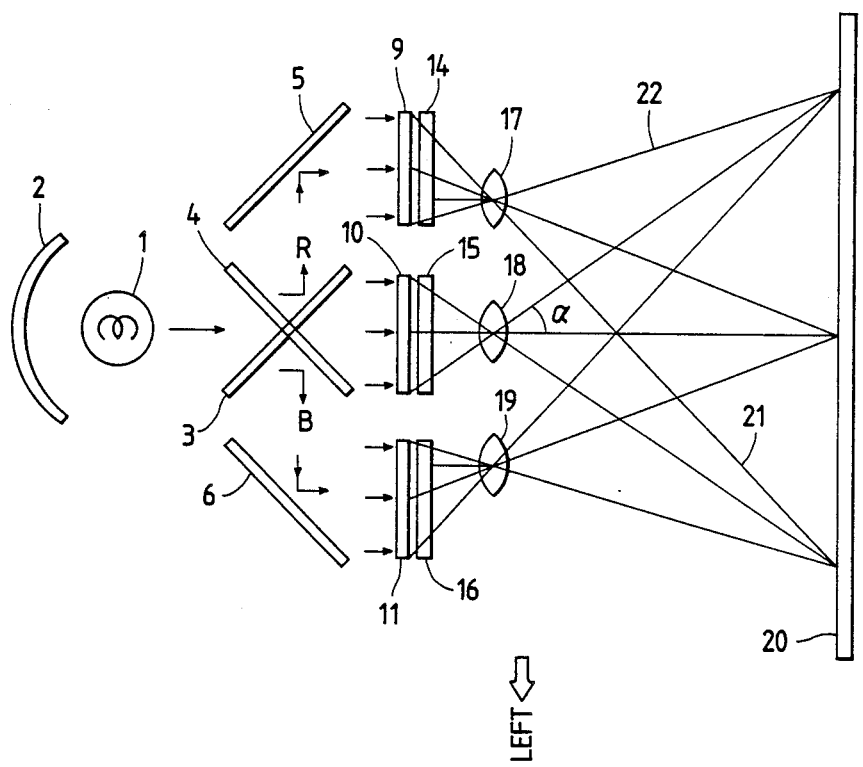
FIG. 1 is a top view showing an embodiment of the present invention.

FIG. 1 is a top view showing the construction of one embodiment of the present invention wherein the numeral 1 denotes a light source such as a halogen lamp or a xenon lamp, numeral 2 denotes a condenser mirror, numeral 3 denotes an R reflecting, B/G transmitting dichroic mirror, numeral 4 denotes a B reflecting, R/G transmitting dichroic mirror, numerals 5 and 6 denote mirrors, numerals 9, 10 and 11 denote liquid crystal panels for R, G and B, respectively; numerals 14, 15 and 16 denote Fresnel lenses for R, G and B, respectively; numerals 17, 18 and 19 denote projection lenses for R, G and B, respectively; and numeral 20 denotes a screen. The Fresnel lenses 14, 15 and 16 each have a concentric Fresnel lens surface formed on an incident surface side thereof.

FIG. 3 shows decentered conditions of the Fresnel lenses 14, 15 and 16 as seen from the respective incident surfaces. As shown, the central Fresnel lens 15 for G is not decentered, while the right and left Fresnel lenses 14 and 16 for R and B are decentered The amount of decentering is such that the center is substantially coincident with an intersecting point of the optical axis of each projection lens indicated by a dot-dash line in FIG. 1 and the corresponding liquid crystal panel. The optical axes of the three projection lenses are substantially perpendicular to the screen 20. The center of each projection lens is positioned on a straight line connecting the center of the corresponding liquid crystal panel with the center of the screen, as shown in FIG. 1.

A focal position of each Fresnel lens is set at a substantially central position of the entrance pupil of the corresponding projection lens. Consequently, an inlet light which is incident substantially perpendicularly on the corresponding liquid crystal panel leaves the same panel and is thereafter directed toward the center of the entrance pupil of the projection lens by the Fresnel lens. Thus, the light can pass through the projection lens at a maximum efficiency. As the screen 20 there may be used, for example, a screen for rear projection as disclosed in U.S. Pat. No. 4,536,056.

Figure 4:
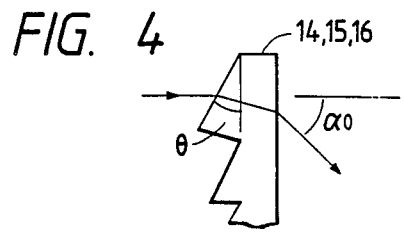
FIG. 4 is a side view of the Fresnel lenses.

A prism angle of each part of the Fresnel lenses 14, 15 and 16 is determined from a required exit angle $\alpha_0$ shown in FIG. 4, using the following equation, on the basis of the Snell's law wherein $\alpha_0$ represents an angle (field angle) of viewing the center of the entrance pupil of each projection lens from the corresponding Fresnel lens:

$$\tan \theta = \frac{\sin \alpha_0}{n - \cos \alpha_0} \quad (1)$$

In the above equation, n is a refractive index, which is almost equal to 1.5. Even in the case of a wide field angle of 45° as $\alpha_0$, substitution thereof into the above equation gives a prism angle of about 42° which results in a size that is easily producible. The Fresnel lens pitch is smaller than the size of picture element units on the liquid crystal panels and it is usually selected to about 0.1 mm or less.

Although in FIG. 1 each projection lens is shown as a single lens, the projection lens may be a combination of lenses. Further, the condenser mirror 2 may be constituted as a dichroic mirror which transmits infrared rays and reflects visible light rays.

By the action of the Fresnel lenses 14, 15 and 16 in FIG. 1 there can be realized an optical system of a wide field angle and the quantity of light at diagonal corners on the screen relative to the image plane center is improved over the prior art. For example, however, when comparison is made between output light rays 21 and 22 of the projection lens 17 in FIG. 1, it is seen that the light ray 21 is relatively smaller in the quantity of light in reaching the screen 20. Thus, there occurs the case where R, G and B reaching the same spot on the screen are not equal in the quantity of light. If they are equal, white light results, but when they are not equal, the color tone on the screen deviates in the direction of R or B. This deviation (that is, R, G and B reaching the same spot on the screen are not equal in the quantity of light) is caused by the dependence of the reflection loss on the Fresnel lens surface upon the prism angle and the dependence of the light transmission efficiency of each projection lens upon the field angle.

The color tone deviation can be remedied by disposing a plate which shields light partially on the exit side of each of the projection lenses 17 and 19 in positions distant from the projection lens 18. Alternatively, it can also be overcome by partially disposing a light shield between the incident surfaces of the liquid crystal panels and the light source in FIG. 1, for example, on the mirrors 5 and 6.

Figure 5:
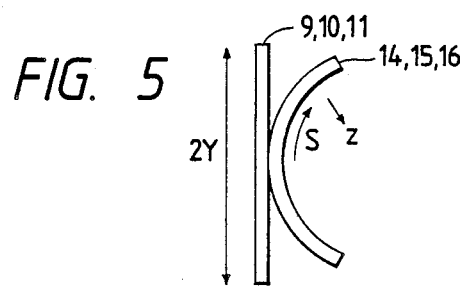
FIG. 5 is a vertical sectional view showing an annealed shape of a Fresnel lens in accordance with the present invention.

In some working environments, moreover, there sometimes occurs the case where the Fresnel lenses are not in close contact in parallel with the liquid crystal panels but rather are warped, thus forming a gap between the Fresnel lens and liquid crystal panel, which gap causes detrimental defocusing. In using the display in such working environment, the adhesion between the two can be improved by annealing, i.e., heating the Fresnel lenses 14, 15 and 16 and at a temperature of about 80° F. so that the Fresnel lens assumes a shape as shown in FIG. 5 and as will be described in detail below and permitting the lenses to cool. Thereafter, the Fresnel lens of such shape is pushed at peripheral end faces forcibly against the respective liquid crystal panels 9, 10 and 11 by a spring member or the like so as to be retained in close contact with the liquid crystal panel.

The shape of each Fresnel lens will be described using the coordinate system (s, z) shown in FIG. 5, wherein s represents creeping distance coordinates as measured along the Fresnel lens surface vertically from the center of the lens, and z represents distance coordinates in a direction perpendicular to the Fresnel lens surface. The curvature of the Fresnel lens at the creeping distance s is assumed to be 1.

$$\theta_1(s) = \frac{F_1}{2EI}(Y^2 - S^2) + \frac{1}{R_0} \quad (2)$$

where
E: Young's modulus of the Fresnel lens material
I: second moment of area of the Fresnel lens $$I = \frac{bh^3}{12}$$

[b: width of the Fresnel lens (perpendicular to the paper surface in FIG. 5), h: thickness of the Fresnel lens]

Y: half of the overall height of the Fresnel lens
$F_1$: pressing force per unit height (as will be described later)

Substitution of $s = \pm Y$ in the above equation gives $$1(\pm Y) = \frac{1}{R_0}.$$

That is, $R_0$ is the radius of curvature at upper and lower end portions.

In the above equation, E, I and Y are constants which are determined by the material and outside diameter of the Fresnel lens. The curvature $_1(s)$ in each s coordinates is given by the above equation (2), whereby the annealed shape of the Fresnel lens is determined in a unitary manner. The remaining freedoms or parameters for determining the profile (side profile) of $_1(s)$ and $R_0$ and $F_1$.

An example is:

$$\left. \begin{array}{rcl} R_0 & \approx & 2Y \\ F_1 & \approx & \dfrac{2EI}{R_0 Y^2} \end{array} \right\} \quad (3)$$

Figure 6:
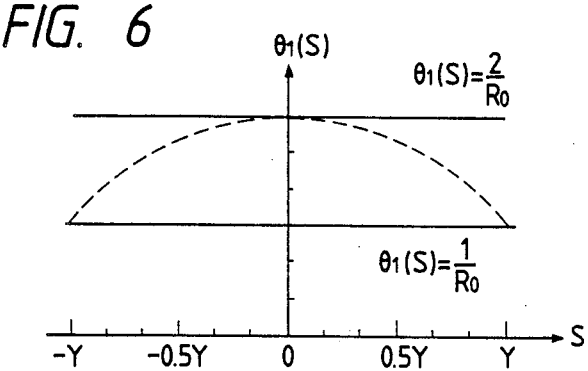
FIG. 6 is a characteristic diagram showing an example for annealing.

The profile of $_1(s)$ in the case of $R_0$ and $F_1$ being selected is as indicated by a dotted line in FIG. 6.

The meaning of the first term and that of the second term on the right side of the above equation (2) will be explained below.

In FIG. 5, if the Fresnel lens 14 is pushed at its upper and lower ends against the liquid crystal panel 9, the Fresnel lens will be deformed elastically into a flat shape along the liquid crystal panel. This is an actual state of use in the projection system with the Fresnel lens being retained in the flat shape by a spring force or the like. In this state, the force exerted per unit height of the Fresnel lens will now be determined. This force is given by the product of quadratic differential of the curvature $_1(s)$ and EI in accordance with strength of materials $$EI \frac{d^2 \theta_1(s)}{(ds)^2} = EI \frac{F_1}{2EI}\left( -\frac{d^2(s^2)}{(ds)^2} \right) \quad (4)$$

$$= -F_1$$

In more particular terms, if annealing (heating and cooling) corresponding to the shape of the above equation (2) is applied in advance, a bond stress of Fl per unit height is always exerted between the panel and the lens in an actual state of use in which the upper and lower ends of the Fresnel lens are pushed against the liquid crystal panel by a spring member or the like.

As is seen from the deriving process of the above equation (4), the second term $[1/R_0 9$ on the right side of the equation (2) does not contribute to the bond stress. Only the first term contributes to the bond stress In other words, the first term on the right side of the equation (2) is essentially important in order to ensure a uniform adhesion throughout the whole surface of the light crystal panel and that of the Fresnel lens.

When the above is expressed generally and physically, it is necessary that the curvature profile $_1(s)$ be an upwardly convex graph, that is, the quadratic differential of $_1(s)$ be negative.

On the other hand, the second constant term $[1/R_0]$ on the right side of the equation (2) is an essential element for the resistance to environment. For example, in a transitional state in which the amount of moisture absorbed on the exit surface side ($z > 0$ side in FIG. 5) of the Fresnel lens is larger than that on the incident surface side thereof, the Fresnel lens tries to warp in a direction opposite to the warp polarity in FIG. 5 by virtue of a bimetal effect. To cancel this effect, the term $1/R_0$ in the equation (2) is necessary.

In the case where a polycarbonate resin or a polystyrene resin, which are small in hygroscopicity, is used as the material of the Fresnel lens, it is appropriate to make the selection of $R_0 \leq 4Y$ (2Y being the height of the Fresnel lens). In the case of an acrylic resin which is large in hygroscopicity, it is appropriate that the selection be made for $R_0 \leq 2Y$.

Figure 7:
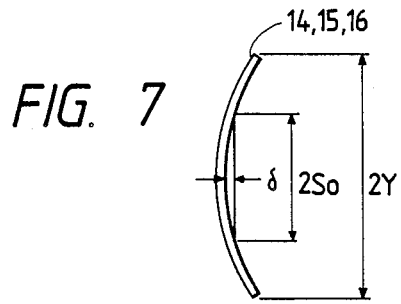
FIG. 7 is an explanatory view showing an inspecting and measuring method for the annealing.

As to the annealed shape of the Fresnel lens, it is necessary for ensuring the adhesion between the liquid crystal panel and the Fresnel lens that $_1(s)$ be always positive and a quadratic differential of $_1(s)$ be always negative. The value of $_1(s)$ can be measured in a simple manner by applying a ruler having a small length of $2S_0$ to the Fresnel lens vertically thereof and then measuring a gap $\delta$, as shown in FIG. 7. The value of $_1(s)$ can be roughly estimated from the gap $\delta$ according to the following equation:

$$\theta_1(s) \approx \frac{S_0^2}{2\delta} \quad (5)$$

When the aforementioned conditions are satisfied, the adhesion between the liquid crystal panel and the Fresnel lens is ensured when the Fresnel lens is forced into a flat shape.

In FIG. 1, there is a misregistration caused by deviation in the positioning and direction of each optical element disposed in FIG. 1 which is the same as that in the prior art show in FIG. 2 Accordingly, the details thereof are omitted, it being recognized that such misregistration can be compensated in a manner known in the art.

In FIG. 1, however, the deviation among the projection lenses 17, 18 and 19 is a problem specific to the present invention. Particularly, since the projection lenses 17 and 19 are used in an eccentric state in the transverse direction, there occur deviations in the magnification and linearity in the transverse direction. Incidentally, there also occur slight deviations in the vertical direction. Such misregistration is overcome by the block diagram circuit arrangement shown in FIG. 8. In the following description it is assumed that the number of picture elements of an input signal is equal to the total number of picture elements of the liquid crystal panel and three identical circuit arrangements to that shown in FIG. 8 would be respectively provided for the colors R, G and B, with FIG. 8 and the following description referring only to color R, for example. However, it is not necessary that the number of picture elements of the input signal equal the total number of picture elements of the liquid crystal panel.

Figure 8:
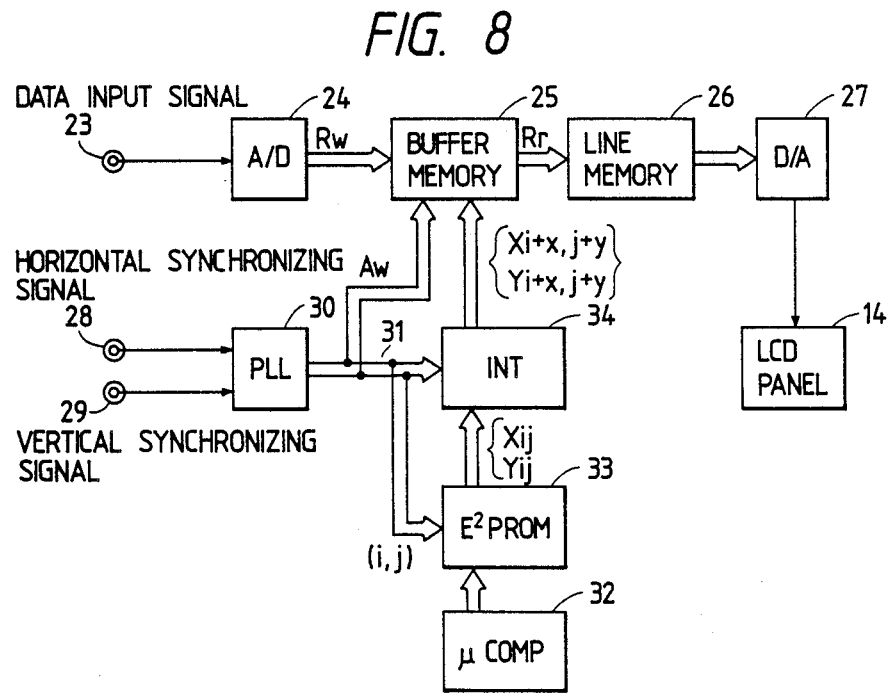
FIG. 8 is a block diagram showing a misregistration correcting circuit for correcting misregistration of images on a screen in accordance with the present invention.

In FIG. 8, single-line arrows each represent an analog signal or a digital signal of one bit, while double-line arrows each represent a digital signal of two bits or more The numeral 23 denotes a data input signal terminal for any of R, G and B, but FIG. 8 and the accompanying description is directed to R; numeral 24 denotes an A/D converter (analog/digital converter); and numeral 25 denotes a buffer memory. A required capacity of the buffer memory is pre-set depending on the degree of misregistration in the optical system shown in FIG. 1.

For example, if the degree of misregistration corresponds to a dot pp in the horizontal direction and b line pp in the vertical direction, the result is assumed to be a×b picture elements. Since the gradation per picture element is usually 8 bits, the memory capacity is (8×a×b) bits.

Numeral 26 denotes a line memory, in which is stored information corresponding to one scanning line. The output of the line memory 26 is converted from digital to analog by a D/A converter (digital/analog converter) 27 and then applied to the liquid crystal panel 14 (R liquid crystal panel) to control the transmissivity thereof.

Numeral 28 denotes a horizontal synchronizing signal input terminal; numeral 29 denotes a vertical synchronizing signal input terminal; and numeral 30 denotes a circuit for generating an address signal (Aw), which circuit includes a PLL circuit for the reproduction of clocks and is of a configuration known in the art. The address signal Aw is used as a writing address signal for writing color data indicated as Rw into the buffer memory 25.

Numeral 32 denotes a representative lattice point generating portion, for example, a microcomputer. There are about 16×16=256 representative lattice points on the liquid crystal panel surface. Numeral 33 denotes a reloadable nonvolatile memory, for example, a general-purpose E² PROM. The number of addresses required therefor is about 256 which is equal to the number of the representative lattice points. The number of bits, N, required of each address is given by the following expression:

$$N \geq \log_2 a + \log_2 b \tag{6}$$

wherein a and b represent maximum values in the foregoing misregistration. For example, if a=16 dots and b=16 lines, there are required 8 bits as N.

Therefore, the memory capacity required of the E² PROM is about 256 bytes. Numeral 34 denotes an interpolating portion, which performs the following calculations:

$$X_{i+x,j+y} = P_{i,j} X_{i,j} + P_{i+1,j} X_{i+1,j} + P_{i,j+1} X_{i,j+1} + \tag{7}$$
$$P_{i+1,j+1} X_{i+1,j+1}$$

$$Y_{i+x,j+y} = P_{i,j} Y_{i,j} + P_{i+1,j} Y_{i+1,j} + P_{i,j+1} Y_{i,j+1} + $$
$$P_{i+1,j+1} Y_{i+1,j+1}$$

In the above equations, i and j represent the value of 4 bits of higher order in the horizontal coordinates and that of 4 bits of higher order in the vertical coordinates, respectively, in the foregoing writing address signal Aw. Each can take a value of 0, 1, 2 ... 15 in accordance with 16×16 representative lattice points.

Xi, j, Yi, j, etc. each indicate representative lattice point data. Pi, j, Pi+1, j, Pi, j+1 and Pi+1, j+1 are weight coefficients for interpolation. In the case of linear interpolation, they are given by the following equations. However, for more precise application, well known non-linear interpolation techniques based upon, for example, 2nd order differentiation may be utilized.

$$\left.\begin{array}{l} P_{i,j} = (1-x)(1-y) \\ P_{i+1,j} = x(1-y) \\ P_{i,j+1} = (1-x)y \\ P_{i+1,j+1} = xy \end{array}\right\} \tag{8}$$

In the above equations, x and y represent horizontal and vertical coordinates with 4 bits of higher order in the writing address Aw removed. That is, the writing address Aw can be expressed in vector form as follows:

$$Aw=(i+x, j+y) \tag{9}$$

In the above equation, i+x represents horizontal coordinates, i being an integer part and having a value of 0 to 15, x representing a decimal value, while i+y represents vertical coordinates, j being an integer part and having a value of 0 to 15, y representing a decimal value.

Where the total number of picture elements is 512×512, since each is 9 bits, x and y each represent 5 bits of lower order exclusive of 4 bits of higher order. That is, x and y each have a value of (0, 1, 2, ... 31)×2⁻⁵. Therefore, it can be said that the equations (8) represent principles of linear interpolation.

The results of calculation of the equations (7) and (8) have decimal values, which however can be ignored in ordinary use. The integer part of (Xi+x, Yj+y) is applied to the buffer memory 25 in FIG. 8 and the value Rr of a red color signal stored in the corresponding address is read out.

The value of the red color read out signal Rr is applied to a line memory 26 having a construction known in the art, with the output therefrom then being converted from digital to analog form in a D/A converter 27, and then applied to the R liquid crystal panel 14 to control the transmissivity thereof.

Data for compensating misregistration on the screen with respect to each representative lattice is written from the data generating portion 32 into the E² PROM 33 in the stage of assembly and adjustment at a factory. Once written, this data is held in the E² PROM without being lost even when the power is turned OFF. In FIG. 1, therefore, images of good registration can be reproduced and projected until an optical component requires repair or replacement with a resultant change in the data.

Although it has been suggested above that decimal values in the results of calculation of the equations (7) can be ignored in ordinary use, in the case of precision applications where the said rounding error causes a problem, even decimal values can be utilized as follows. The integer parts of Xi+x, j+y and Yi+x, j+y are assumed to be M, N, and decimal parts thereof are assumed to be m, n, namely:

$$\left.\begin{array}{l} X_{i+x,j+y} = M + m \\ Y_{i+x,j+y} = N + n \end{array}\right\} \tag{29}$$

From the buffer memory there are read not only the signal value of address (M, N), but also the signal values of addresses (M+1, N), (M, N+1) and (M+1, N+1).

And the interpolation output of the following equation is used as a R read out signal value Rr:

$$Rr = (1 - m)(1 - n) R_{M,N} + m(1 - n) R_{M+1,N} + \qquad (11)$$

$$(1 - m) n R_{M,N+1} + mn R_{M+1,N+1}$$

By the above processing there can be reproduced a finer image. Reading four data from the buffer memory 25 as mentioned above requires a high processing speed. As previously noted, however, the memory capacity required of the buffer memory 25 is (8ab) bits, and since the values of a and b are usually 16 dots, 16 lines, or less, it is about 256 bytes or so in total. Thus, the memory capacity is extremely small, so it is economically easy to attain speed-up and paralleling.

When the misregistration correcting circuit configuration shown in FIG. 8 is combined with the embodiment illustrated in FIG. 1, the optical axes of the projection lenses 17 and 19 in FIG. 1 are not always required to be perpendicular to the screen. For example, such lenses may be inclined toward the center of the screen and trapezoidal strains induced can be compensated by the construction of FIG. 8.

Figure 9:
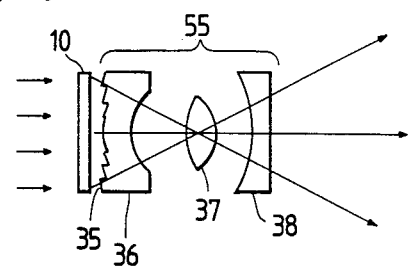
FIG. 9 illustrates a combined Fresnel and projection lens accordance with the present invention.

Although the projection lenses 17, 18 and 19 shown in FIG. 1 are each illustrated as a single lens, usually a combination of three or more lenses is employed. In this case, the lens element disposed in the position closest to the liquid crystal panel side and the corresponding Fresnel lens used in the present invention may be constituted integrally with each other. A principal portion of such integral construction is illustrated in FIG. 9, the numeral 10 denotes a liquid crystal panel and numeral 55 denotes a projection lens. The projection lens 55 is composed of lens elements 36, 37 and 38. Numeral 35 denotes a Fresnel lens surface formed on the incident surface of the lens 36 which is disposed on the incident surface.

Figure 10:
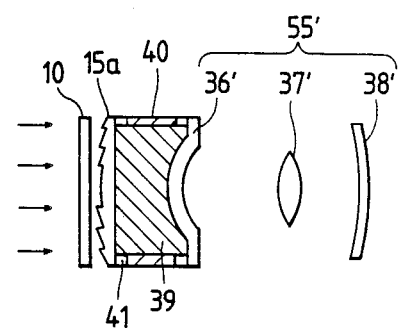
FIG. 10 illustrates another embodiment of a combined Fresnel and projection lens.

Another embodiment of the combined projection lens is illustrated in FIG. 10, in which the numeral 10 denotes a liquid crystal panel and numeral 15a denotes a Fresnel lens. The elements 36', 37' and 38' constitute a projection lens 55'. Numeral 39 denotes a coolant charged into the space between the lens element 36 and the Fresnel lens 15a, for example, silicon oil. Numeral 40 denotes a metallic part serving as both a coolant container and a heat dissipation surface, and numeral 41 denotes an O-ring formed of fluorine rubber and functioning to seal the coolant. Where importance is attached to color purity, the improvement of color purity and that of contrast can be attained by imparting to the coolant 39 spectrotransmission characteristics according to the colors of R, G and B in advance.

Although the above description has been directed to a three-panel type projection system, it is of course possible to apply the present invention to a four or more panel type as well as to a two-panel type. For the projection of color images by a two-panel type, there usually are employed one panel for green and another one panel for red and blue. However, when the blue component of a light source is insufficient, it is effective to use the combination of one blue panel and one green/red panel.

The arrangement of Fresnel lenses in the present invention is effective particularly in the combination thereof with liquid crystal panels, but even when applied to a CRT type projector, it is effective in widening the field angle and attaining a compact construction. In the application to a CRT type projector, however, the contrast will be deteriorated because of a large thickness of the CRT face glass and also because the light reflectance of the CRT fluorescent screen is as large as about 80%. The deterioration of contrast is caused by returning of the reflected light from the Fresnel lens surface to the CRT fluorescent screen. Since it is difficult to remedy this deterioration, the Fresnel lens arrangement as disclosed is generally not suitable in an application field where a color image of high contrast is required. On the other hand, in the case of a liquid crystal panel, the light reflectance of the panel surface is as small as 10% or less. Therefore, the deterioration of contrast based on the aforementioned causes is reduced and hence the present invention is extremely effective Although in the above described embodiments the Fresnel lenses 14, 15 and 16 have Fresnel lens surfaces formed on the respective incident surface sides, the Fresnel lens surfaces may be formed on the exit surfaces sides of those Fresnel lenses when applied to an optical system in which the field angle required is a medium field angle in the range of 25° to 30°. In that case, the liquid crystal panels 9, 10, 11 and the Fresnel lenses 14, 15, 16 may be constituted integrally. In other words, the exit surface itself of each liquid crystal panel may serve as a Fresnel lens surface.

Figure 11:
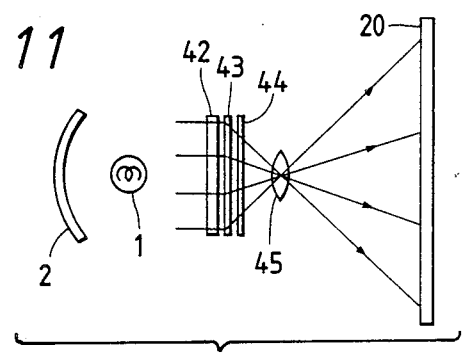
FIG. 11 illustrates an arrangement utilizing two Fresnel lenses for an ultra-compact projector of a multi-projector system.

The present invention is also effective in constituting an ultra-compact projector of an ultra-wide field angle by combination with a one-panel type color liquid crystal panel for a multi-projector system which can be obtained with multiple screens and multiple projectors or a single large screen and multiple projector. As shown in FIG. 11, numeral 1 denotes a light source; numeral 2 denotes a condenser mirror; 42 a color liquid crystal panel; 43, 44 Fresnel lenses; 45 a projection lens; and 20 a screen. The converging force can be enhanced by using two or more Fresnel lens surfaces and hence it is possible to realize an optical system of a wider field angle.

Figure 12:
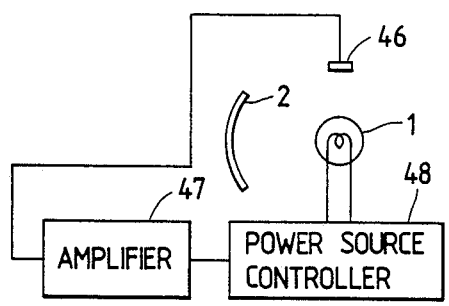
FIG. 12 illustrates light power control for a unit projector of a multi-screen system.
Figure 13:
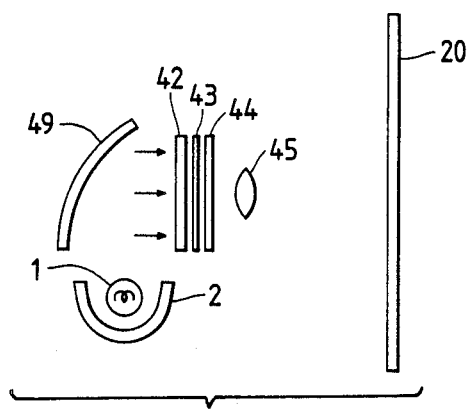
FIG. 13 illustrates an arrangement for reducing depth of a unit projector of a multi-projector system.

The wide field angle optical system according to the present invention is extremely effective in its application to a so-called multi-screen display This is because a wide field angle results in reduction of the projection distance relative to a certain unit screen size (e.g. 40" diagonal) and hence, a giant screen can be realized by arranging projectors right, left and up, down while keeping the depth of each unit projector small. A principal part of a construction suitable for such use is illustrated in FIG. 12 wherein numeral 1 denotes a light source; numeral 2 denotes a condenser mirror; 46 a photodiode detector; 47 an amplifier; and 48 a power source controller. The light output of the light source 1 can be maintained constant by utilizing the power source controller 48 to control the power source for the light source so that the detection output power of the photodiode detected by detector 46 is made constant according to a negative feedback circuit technique Therefore, it is possible to suppress the unbalance of the change with time in the quantity of output light among the projectors which constitute the multi-screen. Consequently, it is possible to constitute a giant multi-screen superior in uniformity. The depth of each unit projector may be further reduced by the construction shown in FIG. 13 wherein numeral 49 denotes a condenser mirror for condensing the light from the light source 1 to the liquid crystal panel 42, the other components illustrated being the same as in FIG. 11.

Generally, the liquid crystal panels used in the present invention each comprise a polarizer and an analyzer, of which the polarizer is required to be disposed between the light source and the liquid crystal panel, while the analyzer may be disposed in any position between the panel and the screen, for example, on the exit surface side of the Fresnel lens 15a in FIG. 10, whereby high-temperature deterioration of the analyzer can be prevented.

According to the present invention, by using transmission type liquid crystal panels there can be constituted a liquid crystal panel type projection display having a compact optical system of a wide field angle. Therefore, the applicable field of liquid crystal projectors can be expanded to a remarkable extent and providing extremely high industrial value.

While we have shown and described several embodiments in accordance with the present invention, it is understood that the same is not limited thereto but is susceptible to numerous changes and modifications as known to one of ordinary skill in the art, and we therefore do not wish to be limited to the details shown and described herein but intend to cover all such modifications as are encompassed by the scope of the appended claims.

What is claimed is:

1. A liquid crystal panel type projection display comprising:
    a single screen for display;
    means providing a light source;
    a plurality of different color liquid crystal panels responsive to light from the light source means for providing exit light rays therefrom of corresponding different colors; and
    a plurality of lens means corresponding respectively to the plurality of different color liquid crystal panels for projecting the exit light rays from the liquid crystal panels onto the single screen, the lens means including Fresnel lens means being configured for enabling a projection field angle of at least 25° with respect to the single screen.

2. A liquid crystal panel type projection display according to claim 1, wherein the single screen is a rear projection screen and the light source means, plurality of different color panels and lens means are provided at the rear of the single screen for projecting light rays from the liquid crystal panels onto the rear surface of the single screen, the single screen being viewed at the front surface thereof.

3. A liquid crystal panel type projection display according to claim 2, wherein the lens means includes a plurality of projection lens means corresponding respectively to the plurality of different color liquid crystal panels and having the centers thereof substantially positioned respectively on straight lines connecting the centers of the liquid crystal panels with the center of the single screen, the optical axis of the projection lens means being disposed substantially perpendicularly to the single screen, and the Fresnel lens means including a plurality of Fresnel lens means corresponding respectively to the plurality of different color liquid crystal panels and being disposed respectively between an exit surface of a corresponding liquid crystal panel and the corresponding projection lens means, the lens surface of the Fresnel lens means being decentered in accordance with a relative position of the projection lens means so as to provide a center of the Fresnel lens means disposed substantially on the optical axis of the corresponding projection lens means 4. A liquid crystal panel type projection display according to claim 3, wherein the lens means includes a lens element having the Fresnel lens means as a Fresnel lens surface on a light incident side thereof facing the corresponding liquid crystal panel and having on an opposite side thereof a lens surface as at least part of the projection lens means.

5. A liquid crystal panel type projection display according to claim 3, further comprising coolant means disposed between and coupling the corresponding Fresnel lens means and the corresponding projection lens means.

6. A liquid crystal panel type projection display according to claim 5, wherein the coolant means includes a liquid coolant.

7. A liquid crystal panel type projection display according to claim 1, further comprising:
    A/D converter means for receiving analog image signals to be fed to the liquid crystal panels and for converting the analog image signals to digital signals;
    memory means for storing the digital signals from the A/D converter means in accordance with write addresses;
    read address correcting means including means for storing data necessary for correction of misregistration of images projected onto the single screen the read address correcting means being responsive to the stored data for calculating and outputting corrected read addresses for reading out the digital signals stored in the memory means; and
    D/A converter means for receiving digital signals read out from the memory means in accordance with the corrected read addresses and for converting the digital signals into analog signals and for supplying the analog signals to the liquid crystal panels, thereby enabling correction of misregistration of projection images on the single screen.

8. A liquid crystal panel type projection display according to claim 3, wherein the Fresnel lens means is disposed in close contact with the corresponding liquid crystal panel over substantially the entire surface of the panel, the Fresnel lens means being a Fresnel lens body having an annealed shape with a convex profile of curvature in one dimension.

9. A liquid crystal panel type projection display according to claim 1, further comprising means disposed between the light source means and the liquid crystal panels for separating light emitted from the light source means into light rays of the different plural colors and for supplying the respective different color light rays onto the corresponding liquid crystal panels.

10. A liquid crystal panel type projection display according to claim 1, wherein the lens means enables a projection field angle of greater than 25°.

11. A liquid crystal panel type projection display according to claim 1, wherein the lens means enables a projection field angle of about 35°.

12. A liquid crystal panel type projection display according to claim 3, wherein the projection lens means comprises a plurality of lens elements.

13. A liquid crystal display panel type projection display comprising:
    a single screen;
    means providing a light source;

a plurality of different color liquid crystal panels responsive to light from the light source means for providing exit light rays therefrom of corresponding different colors;

lens means corresponding respectively to the plurality of different color liquid crystal panels for projecting the exit light rays from the liquid crystal panels onto the single screen, the lens means including a plurality of projection lens means corresponding respectively to the plurality of different color liquid crystal panels and having the centers thereof substantially positioned respectively on straight lines connecting the centers of the liquid crystal panels with the center of the single screen, the optical axis of the projection lens means being disposed substantially perpendicularly to the single screen, and a plurality of Fresnel lens means corresponding respectively to the plurality of different color liquid crystal panels and being disposed respectively between an exit surface of a corresponding liquid crystal panel and the corresponding projection lens means, the lens surface of the Fresnel lens means being decentered in accordance with a relative position of the projection lens means so as to provide a center of the Fresnel lens means disposed substantially on the optical axis of the corresponding projection lens means.

14. A liquid crystal panel type projection display comprising:

a single screen for display;

means providing a light source;

a plurality color liquid crystal panels responsive to light from the light source means for providing exit light rays;

a plurality of lens means corresponding respectively to the plurality of liquid crystal panels for projecting the exit light rays from the liquid crystal panels onto the single screen, A/D converter means for receiving analog image signals to be fed to the liquid crystal panels and for converting the analog image signals to digital signals;

memory means for storing the digital signals from the A/D converter means in accordance with write addresses;

read address correcting means including means for storing data necessary for correction of misregistration of images projected onto the single screen, the read address correcting means being responsive to the stored data for calculating and outputting corrected read addresses for reading out the digital signals stored in the memory means; and D/A converter means for receiving digital signals read out from the memory means in accordance with the corrected read addresses and for converting the digital signals into analog signals and for supplying the analog signals to the liquid crystal panels, thereby enabling correction of misregistration of projection images on the single screen.

15. A liquid crystal panel type projection display for use in a multi-projector unit-array display having screen means for display, each projector unit comprising:

means for providing a light source;

at least one liquid crystal panel responsive to light from the light source means for providing exit light rays;

lens means including Fresnel lens means for projecting the exit light rays onto the screen means;

light source intensity detector means for detecting the intensity of the light source means;

amplifier means for amplifying a detection output of the light source intensity detector means; and light source intensity control means responsive to the amplified output from the amplifier means for effecting negative feedback control of the light source means so as to control the light source intensity thereof.

16. A multi-projector unit array display according to claim 15, wherein the Fresnel lens means comprises at least two Fresnel lenses.

17. A multi-projector unit array display according to claim 15, wherein the screen means includes one of a single screen for the multi-projector units and multiple screens corresponding to the multi-projector units.

18. A multi-projector unit-array display comprising:

screen means for display;

light source means;

multi-color liquid crystal panel means responsive to light from the light source means for providing exit light rays;

lens means including Fresnel lens means for projecting the exit light rays from the multi-color liquid crystal panel means onto the screen means so as to enable a projection field angle of at least a predetermined angle.

19. A multi-projector unit-array display according to claim 18, wherein the Fresnel lens means include at least two Fresnel lenses enabling a projection field angle of at least 25°.

20. A multi-projector unit-array display according to claim 18, wherein the screen means includes a single screen for multiple projection units.

* * * * *